United States Patent [19]

Russell

[11] Patent Number: 5,408,755

[45] Date of Patent: Apr. 25, 1995

[54] SUPPORT SYSTEM FOR A GAUGE BAR MEASURING SYSTEM

[75] Inventor: H. Vernon Russell, Perkasie, Pa.

[73] Assignee: Hein-Werner Corporation, Waukesha, Wis.

[21] Appl. No.: 766,852

[22] Filed: Sep. 27, 1991

[51] Int. Cl.⁶ .......................................... G01D 21/00
[52] U.S. Cl. .................................... 33/608; 33/572; 33/645
[58] Field of Search ................ 33/608, 572, 288, 809, 33/520, 600, 645

[56] References Cited

U.S. PATENT DOCUMENTS

| | | | |
|---|---|---|---|
| 3,869,804 | 3/1975 | Friend | 33/288 |
| 4,322,890 | 4/1982 | Jarman et al. | 33/608 |
| 4,366,624 | 1/1983 | Bergstrom | 33/288 |
| 4,513,508 | 4/1985 | Jarman et al. | 33/600 |
| 4,539,758 | 9/1985 | Riutta | 33/288 |
| 4,558,521 | 12/1985 | Steck et al. | 33/573 |
| 4,561,187 | 12/1985 | Powell | 33/608 |
| 4,610,093 | 9/1986 | Jarman et al. | 33/608 |
| 4,731,936 | 3/1988 | Aldrich et al. | 33/608 |
| 4,939,848 | 7/1990 | Armstrong | 33/608 |

FOREIGN PATENT DOCUMENTS

| | | | |
|---|---|---|---|
| 0107538 | 5/1984 | European Pat. Off. | 33/608 |
| 0148002 | 11/1981 | Japan | 33/608 |
| 0121702 | 5/1988 | Japan | 33/288 |
| 8500219 | 1/1985 | WIPO | 33/608 |

*Primary Examiner*—Thomas B. Will
*Attorney, Agent, or Firm*—Foley & Lardner

[57] ABSTRACT

An apparatus and process for measuring the distance between control points on a vehicle, the apparatus including a base assembly for supporting an extendable gauge bar having pointers mounted thereon which are aligned with the control points, the gauge bar including a gauge indicating the distance between the pointers, each base assembly including a base plate and a pedestal mounted on the base plate for matingly engaging the gauge bar, the pedestal being vertically and radially moveable for adjusting the position of the gauge bar.

1 Claim, 6 Drawing Sheets

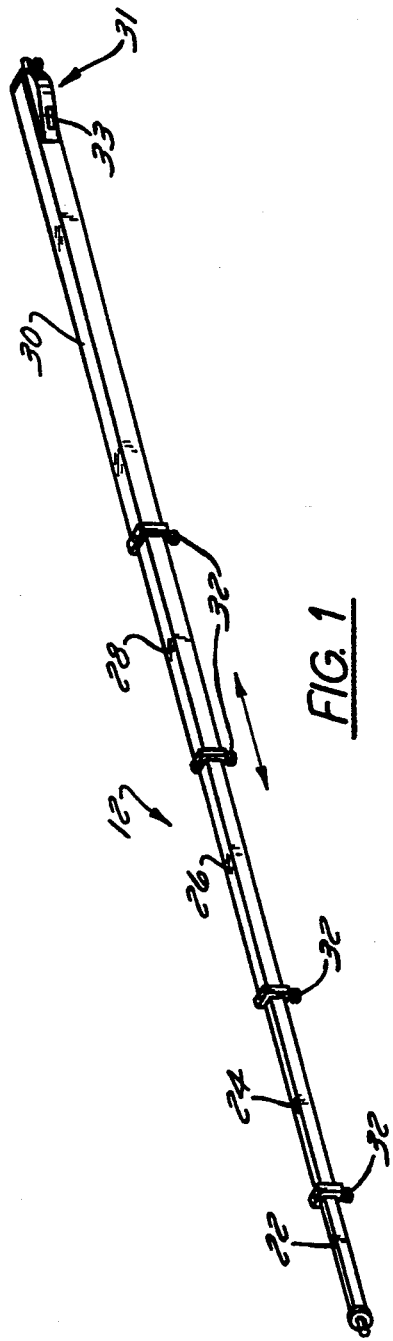
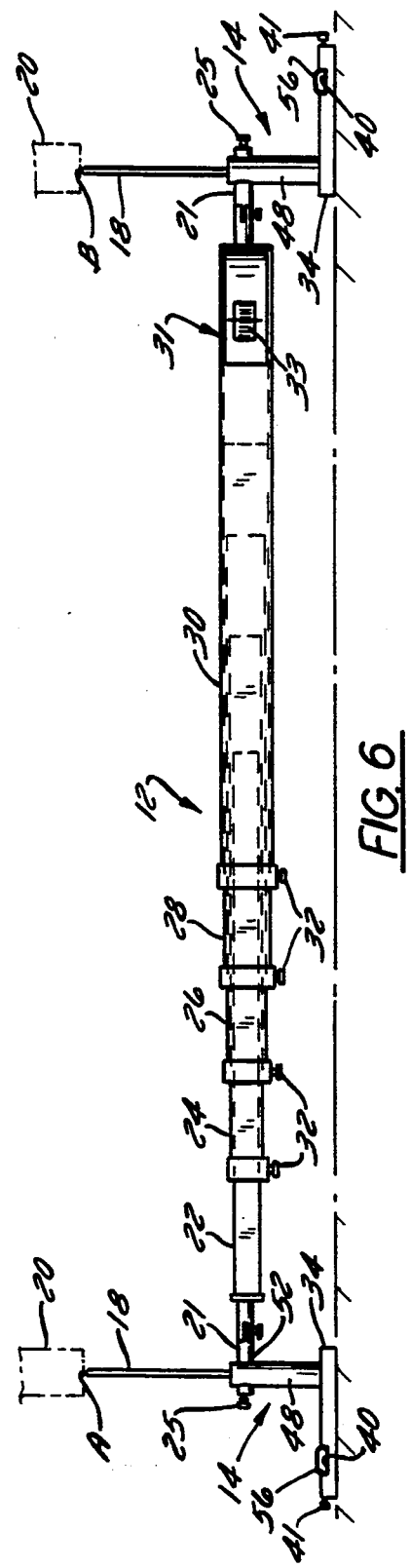

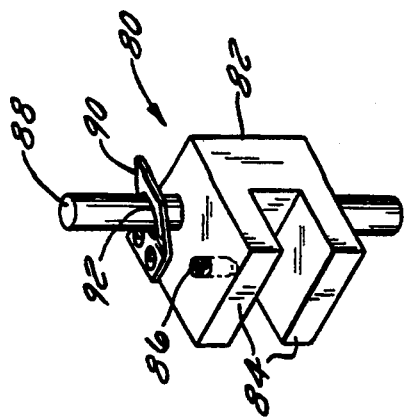
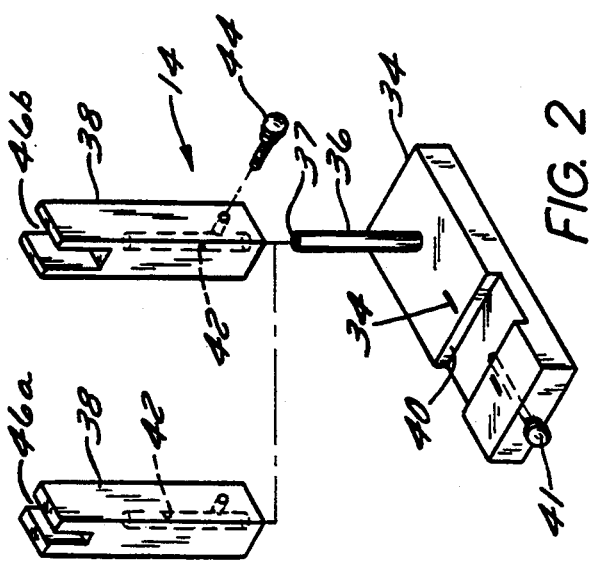
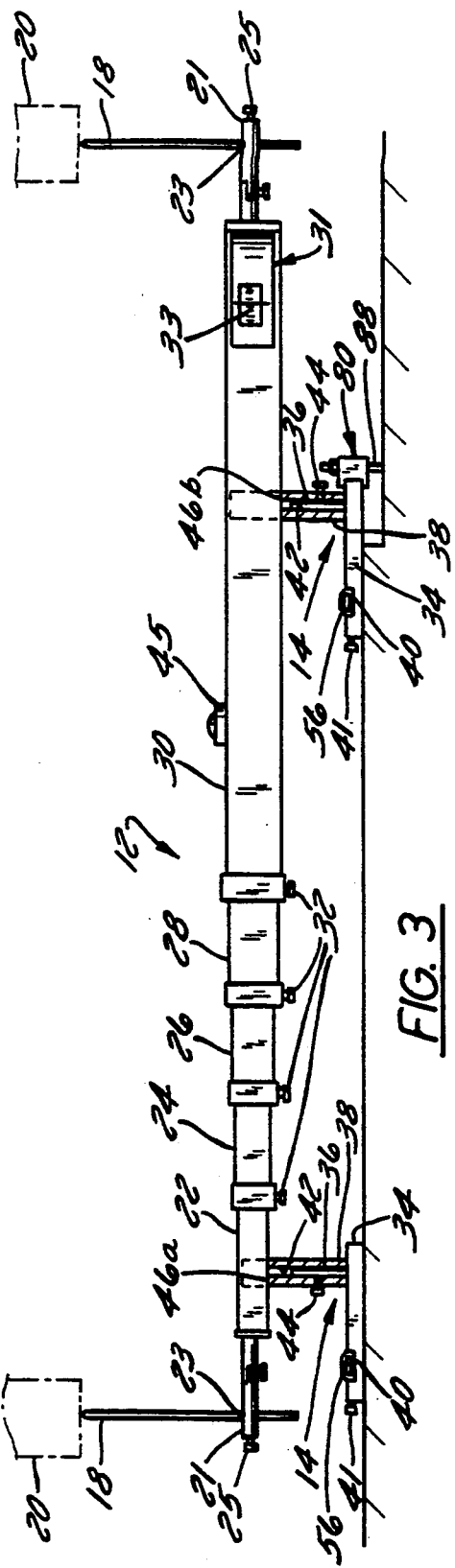

SUPPORT SYSTEM FOR A GAUGE BAR MEASURING SYSTEM

FIELD OF THE INVENTION

The present invention relates to a measuring system for determining the damage to a vehicle and more particularly to a support assembly for supporting the measuring system.

BACKGROUND OF THE INVENTION

Gauge bars of the type contemplated herein are shown and described in U.S. Pat. No. 3,095,651, issued on Jul. 2, 1963, to A. H. Luedicke, Jr., entitled "Tram Gage." The tram gage includes a bar which is held by the user to align pointers on the bar with control points on a vehicle. The pointers are mounted on a pair of brackets which are moveable along the bar to the control points. A measuring tape is provided on the bar which is operatively connected to the brackets to indicate the distance between the pointers on the brackets. The distance between the pointers can then be read directly from the bar. This type of a gauge is particularly useful in measuring distances greater than the reach of the individual holding the bar. They are particularly useful in auto repair work where the bar is used to span both the width and the length of the automobile. They are satisfactory for use in determining horizontal relationships between control points but are particularly difficult to handle when extended over long distances or between control points at different elevations.

Measuring bar devices of the type shown in U.S. Pat. No. 4,689,888, issued on Sep. 1, 1987, to Roger B. Aldrich, et al., entitled "Measuring Device For Use With Automotive Frame Straightening Equipment," describe a typical measuring system used for automobile repair which is suspended beneath the automobile. In this type of a system a longitudinal bar is used to establish a longitudinal datum line for the vehicle with one or more measuring bars mounted laterally to the longitudinal bar for determining the distances of control points from the datum line. These systems are unduly complex and difficult to set up requiring extensive instruction and familiarization with the system in order to become proficient in their use.

The above-described systems are usually used in conjunction with collision repair equipment well known in the art. A disadvantage of those systems, when used with collision repair equipment, is the need to repeatedly disassemble and reassemble the measuring system during the process of applying forces to the vehicle frame being repaired. Another disadvantage with the type of systems described above is that they typically need more than one person to manipulate the measuring bars. In operation the above-described systems are either suspended from the vehicle being repaired or attached to a transverse bar extending the length of the vehicle being repaired or held by the operator; in such instances reliable, repeatable measurements are difficult to obtain.

A need to provide a support system for a gauge bar measuring system that is easily set up and manipulated by one person, which is independent of the vehicle being repaired and which can be used to establish datum planes to verify the location of control points on a vehicle. The present invention fills these needs.

SUMMARY OF THE PRESENT INVENTION

The support system according to the present invention can be quickly and easily attached to a gauge bar having pointers located along the length of the bar. The gauge bar is aligned with selected control points on the vehicle frame and located precisely by aligning the pointers on the control points. The gauge bar can be left with the pointers aligned with the control points or moved to measure other control points. The distance between the pointers can then be read on the gauge bar to determine if the distance between the control points is the same as shown on the vehicle data reference source. The reference source can be of several types known in the art, such as "tram bar", "equal pointer" or "x-y-z" datum sheet. Control point measurements can also be referenced to other reference sources such as another vehicle or an undamaged portion of a vehicle. This system, therefore, provides a freestanding measuring system which requires no special handling. The gauge bars can be advantageously left in the aligned position with the control points while the vehicle is being repaired.

A number of gauge bars can be slidably attached to one of the pointers on the gauge bar to verify the location of additional control points with respect to a measured control point. The distances and relationships can then be compared to the information obtained from the data reference source for the particular vehicle being repaired.

The base assembly can be used to adjust the inclination of the gauge bar for the purpose of establishing a datum plane to facilitate height measurements in accord with the data reference source for the particular vehicle being repaired.

It is an object of the invention to provide a support assembly for a gauge bar measuring system for use in combination with vehicle frame straightening equipment.

A further object of the invention is to provide a support assembly for a gauge bar measuring system that can be left in place during the vehicle repair procedure.

An additional object of the invention is to provide a gauge bar measuring system that can be used on any type of surface, including but not limited to a hard surface floor, a vehicle collision repair bench or a vehicle collision repair rack.

Another object of the invention is to provide a support assembly to which a plurality of gauge bars can be attached to measure several control points simultaneously.

Another object of the invention is to provide a process for measuring control points on a vehicle.

Another object of the invention is to provide a measuring system that can be used by a single person regardless of the distances between control points on a vehicle to be measured.

Another object of the invention is to provide a method for establishing a datum plane in accord with a vehicle data reference source by determining the difference in height between not less than two control points or between one point and a known datum reference point.

Another object of the invention is to provide a method of making multiple measurements from a fixed pointer on a gauge bar by pivotally mounting a plurality of gauge bars on the fixed pointer.

Another object of the invention is to provide a method of measuring control points on a vehicle to be repaired and comparing such measurements to establish measurements shown on a vehicle data reference source to determine the extent of repair work necessary to correct collision damage to such vehicle in an easy to use, simple and inexpensive manner.

Other principal features and advantages of the invention will become apparent to those skilled in the art upon review of the following drawings, the detailed description and the appended claims.

BRIEF DESCRIPTION OF THE DRAWINGS

FIG. 1 is a perspective view of a gauge bar of the type contemplated herein.

FIG. 2 is an exploded perspective view of a cradle type base assembly according to the invention.

FIG. 3 is a side elevation view of the gauge bar supported at each end by a cradle type base assembly.

FIG. 6 is a side elevation view of a gauge bar supported at each end by a cylindrical type base assembly.

FIG. 11 is a perspective view of an adjustable clip for supporting one end of the base plate 34 when mounted on an irregular surface.

Figure 4:
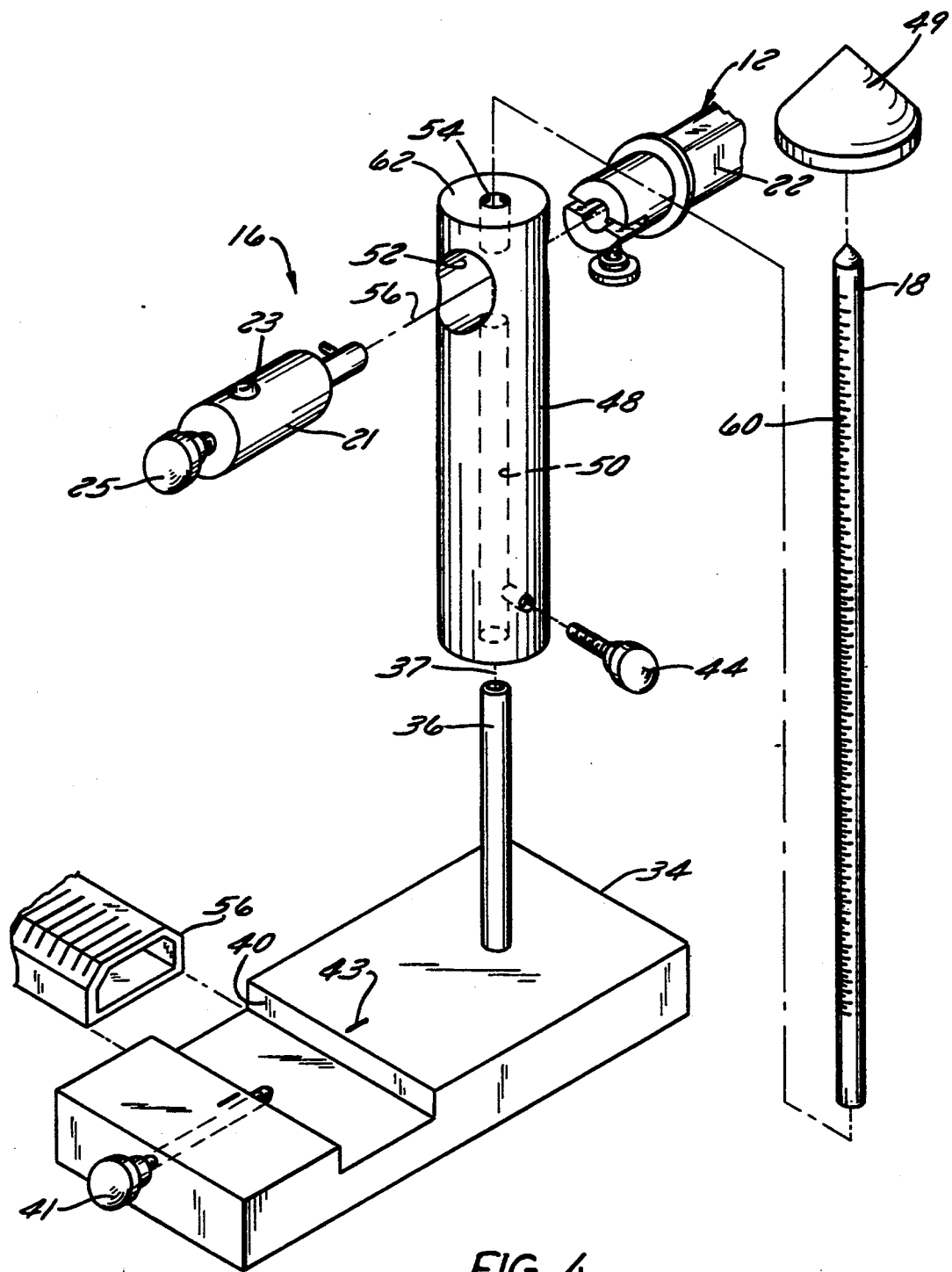
FIG. 4 is an exploded perspective view of a round or cylindrical type base assembly according to the invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

The measuring system 10 according to the present invention generally includes a gauge bar 12, as shown in FIG. 1, which is supported at each end by a base assembly 14. A calibrated pointer 18 is supported on each end of the gauge bar 12 by means of a round extension or adapter 21. Each adapter 21 includes a hole 23 having an axis that is perpendicular to the axis of the gauge bar 12. A set screw 25 is provided in the adapter to set the pointer 18 in the adapter. The pointers 18 when set in the holes 23 by screws 25 should be parallel to each other and lie in a common plane.

Figure 10:
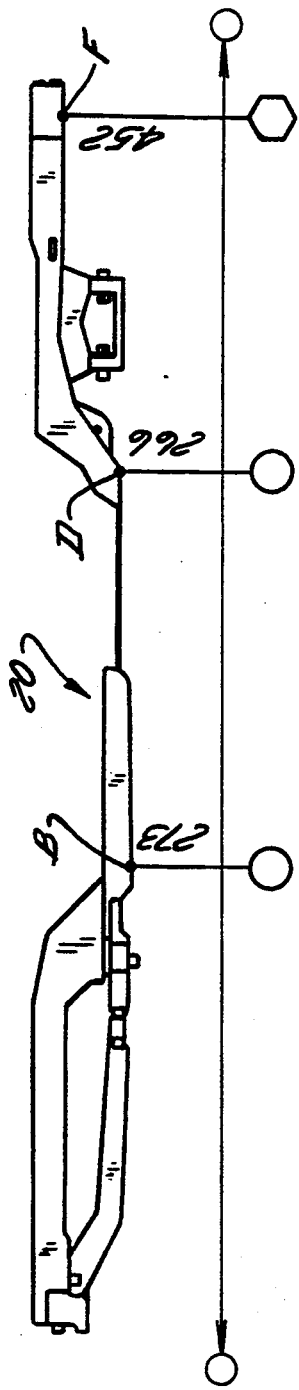
FIG. 10 is a representation of a data sheet showing a side view of an automobile frame.
Figure 9:
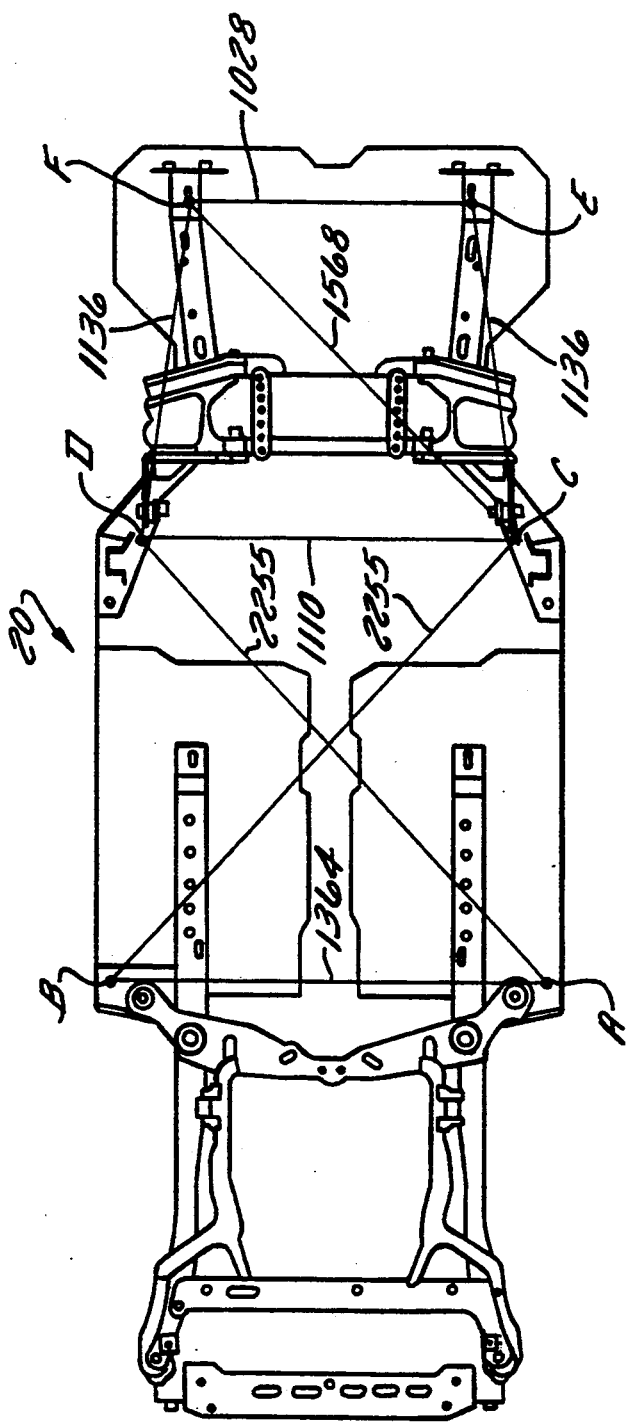
FIG. 9 is a representation of a typical data sheet showing a plan view of an automobile frame.

In use the distance between any two control points A,B on a frame 20 is determined from a reference source such as a data sheet as shown in FIGS. 9 and 10. The gauge bar 12 is extended to set the indicated distance between the pointers 18. The gauge bar 12 is set in the base assemblies 14, as described herein, and positioned under the frame 20. The pointers 18 are aligned with the control points A,B to verify the data sheet distance. It should be noted that once the gauge bar 12 is seated in the base assemblies 14 the gauge bar 12 is self-supporting and can be left under the frame 20 while checking other control points under the frame 20. The difference in height of the control points can also be determined as described hereinafter.

The gauge bar 12 is of a conventional configuration and generally includes a number of telescoping sections 22, 24, 26, 28 and 30 which are clamped in position by set screws 32. The length of the gauge bar 12 is measured by a tape assembly 31 mounted on section 30. The end of the tape is connected to the section 22. As the gauge bar is extended the distance between the pointers 18 appears in window 33 on tape assembly 31. Although a tape is shown and described herein it should be understood that any type (analogue or digital) of indicator could be used to indicate the distance between the pointers 18 on the gauge bar.

In accordance with one aspect of the invention and referring to FIGS. 2 and 3 each base assembly 14, includes a base plate 34 and a vertical pin or tube 36 having a bore 37. The base plate 34 includes a groove or recess 40 which is perpendicular to an index line 43 on the surface of the plate 34. The index line 43 if extended intersects the axis of the bore 37 in tube 36. A pedestal 38, FIG. 2, or 48, FIG. 4, is mounted on the base assembly for adjustably supporting each end of a gauge bar 12. The base plate 34 may be provided with spherical rollers or ball type casters on the bottom for ease of movement of the base assemblies on the surface under the frame of the vehicle. At least three such rollers should be used to support the base assembly.

In this regard each pedestal 38, FIG. 2, includes a bore 42 at the lower end which has a diameter corresponding to the diameter of the tube or pin 36. A thumb screw 44 is provided in the side of the pedestal 38 to secure the pedestal in any radial or vertical position on the pin 36. Each pedestal 38 includes a slot or cradle 46a or 46b having a width corresponding to the width of section 22 or 30, respectively, of gauge bar 12. Although the gauge bar 12, shown and described herein, is of a rectangular cross-section it should be understood that the gauge bar can have any of a number of cross-sectional shapes which are well known to one ordinarily skilled in the art; the slot or cradle 46 in the pedestals 38 can be adapted to accommodate any cross-sectional shape of the gauge bar. It should be noted that the cradle must engage and hold the gauge bar with the pointers 18 in a vertical relation.

Figure 5:
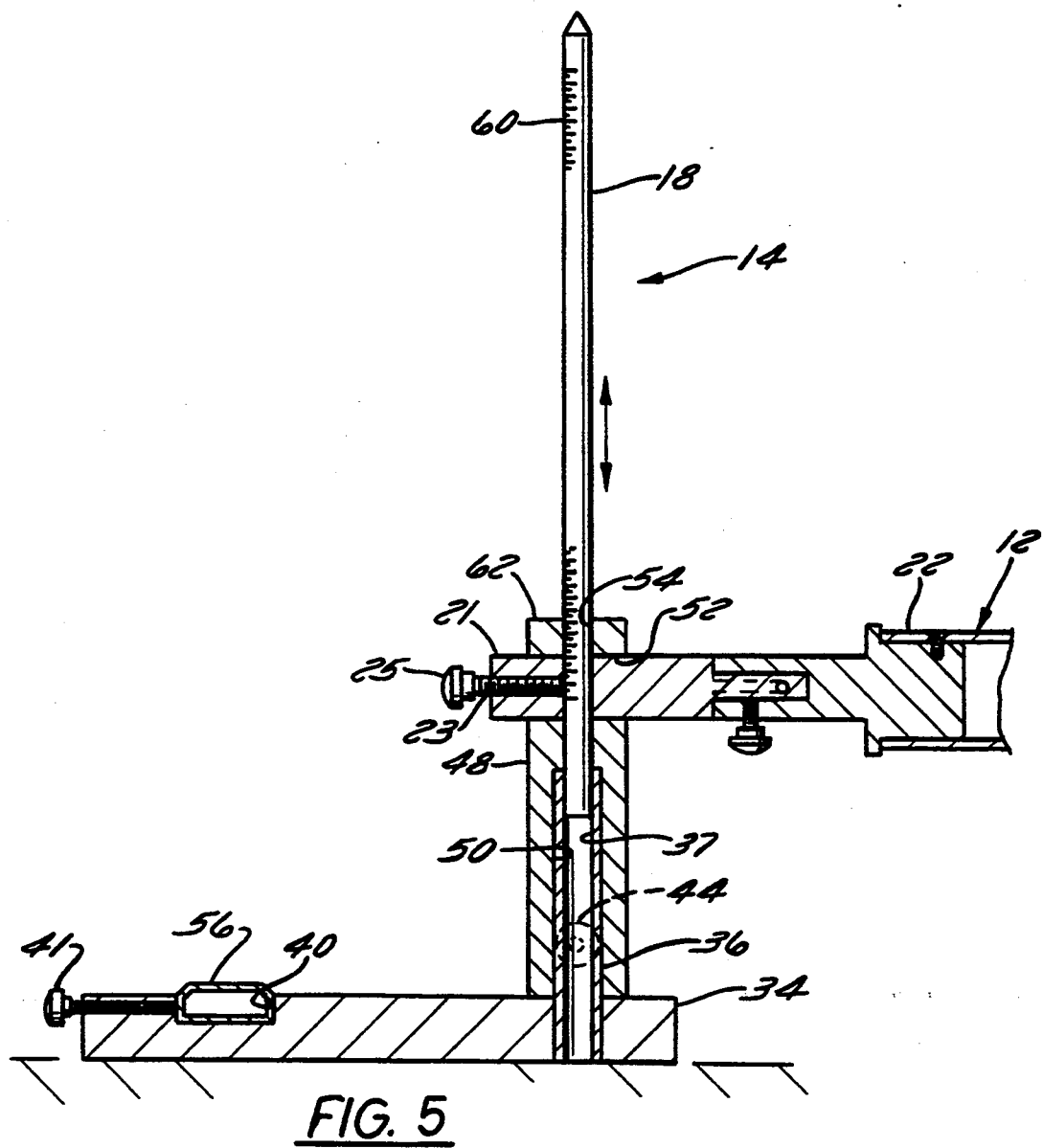
FIG. 5 is a cross sectional view of the round or cylindrical type base assembly shown supporting one end of the gauge bar.

The pedestal 48, shown in FIGS. 4 and 5, has a round or cylindrical shape; however, any configuration may be used. A bore 50 is provided in the bottom of the pedestal. The pedestal 48 is mounted on the tube 36 and secured to the tube 36 by thumb screws 44. The pedestals 48 are provided with a cross bore 52 and an axial bore 54 which intersects the cross bore 52 at the upper end of the pedestal 48. The bore 54 has a diameter corresponding to the diameter of the pointers 18. The bore 37 in pin 36 has a diameter also corresponding to the diameter of a pointer 18 and is axially aligned with bore 54 to allow the pointer 18 to be moved through a greater vertical distance as well as aligning the gauge bar and pointers 18 in a perpendicular relation to the index line 43 on base plate 34.

The gauge bar 12 is mounted in the cross bore 52 in the pedestals 48 by inserting the adapter 21 into the cross bore 52 far enough to align the hole 23 with the bore 54. The adapter 21 is centered in the cross bore 52 by inserting a pointer 18 in the axial bore 54 in the pedestal 48 which passes through the hole 23 in the adapter 21 and into the bore 37 in pin 36. The pointer 18 can then be locked in any vertical position by means of the thumb screw 25. It should be noted that the pointer 18 includes a graduated scale 60 which is read from the surface of the top 62 of the pedestal 48, thus providing a measurement of the distance from the pedestal 48 to the control points on the frame 20 to the pedestal 48. A cone 49 is mounted on the pointer 18 when measuring control points identified by a hole as is generally understood in the art.

Referring to FIG. 3, a side elevation view is shown of the telescopic gauge bar 12 mounted in the cradle type pedestals 38. A pointer 18 is mounted in the adapter 21 at each end of the gauge bar 12. The section 22 of the gauge bar 12 is placed in the cradle 46a in the pedestal 38 and the section 30 is placed in the cradle 46b in the other pedestal 38. It should be noted that the cradle in the pedestals are shaped to provide a snug fit with the sections 22 and 30. When assembled in this configuration, the gauge bar 12 can be used to verify the relation of the control points A, B, C and D which form the torque box of the frame 20, as shown in FIGS. 9 and 10. The vehicle should be anchored to the floor or to a work rack. However, the vehicle does not have to be anchored to verify the distance between control points or the height of the control points.

In this regard and referring to FIG. 9, the control points A, B, C and D are shown for the torque box in the passenger integrity area of the frame 20. The distance between the control points A and D on the data sheet is noted as 2255 millimeters. The gauge bar 12 is set at 2255 millimeters and the locking screws 32 are set. Section 22 of the gauge bar 12 is then set in the cradle 46a in one pedestal and section 30 is set in the cradle 46b in the other pedestal as shown in FIG. 3. The gauge bar 12 with the base assemblies 14 attached is positioned under the vehicle frame 20. One of the pointers 18 is aligned with control point A and the other pointer 18 is aligned with the control point D on the opposite side of the frame. The inclination of the gauge bar 12 is determined by mounting a graded bubble type indicator 45 on one of the sections 22, 24, 26, 28 or 30. Other indicator devices such as a centering gauge, curvature recorder or comparator may be used to determine the inclination of the bar. To adjust the inclination of the bar, either of the pedestals 38 is adjusted and the screw 44 tightened to secure the pedestal to the pin 36.

The pointers 18 are then adjusted to engage the control points and fixed in position by set screws 25. If the control points are the correct distance apart, i.e. 2255 millimeters, the pointers 18 will be seated in the control points. If not, it indicates that it is out-of-line. If correct, the gauge bar 12 is then moved from the control points A and D and aligned to measure the distance between control points B and C in the torque box. The same procedure is used to verify the distance between points B and C. The torque box control points can also be determined by aligning two gauge bars with control points A and B; C and D and determining the parallelism of the two gauge bars by placing an indicator on a common section of each bar. This method will determine the degree of twist, if any, that exists in the torque box. If the torque box measurements are confirmed, it is then possible to use either the two control points A,B in the front of the frame 20 or the two control points C,D in the back of the frame 20 as the base points for determining the damage in the front or back of the vehicle.

Figure 7:
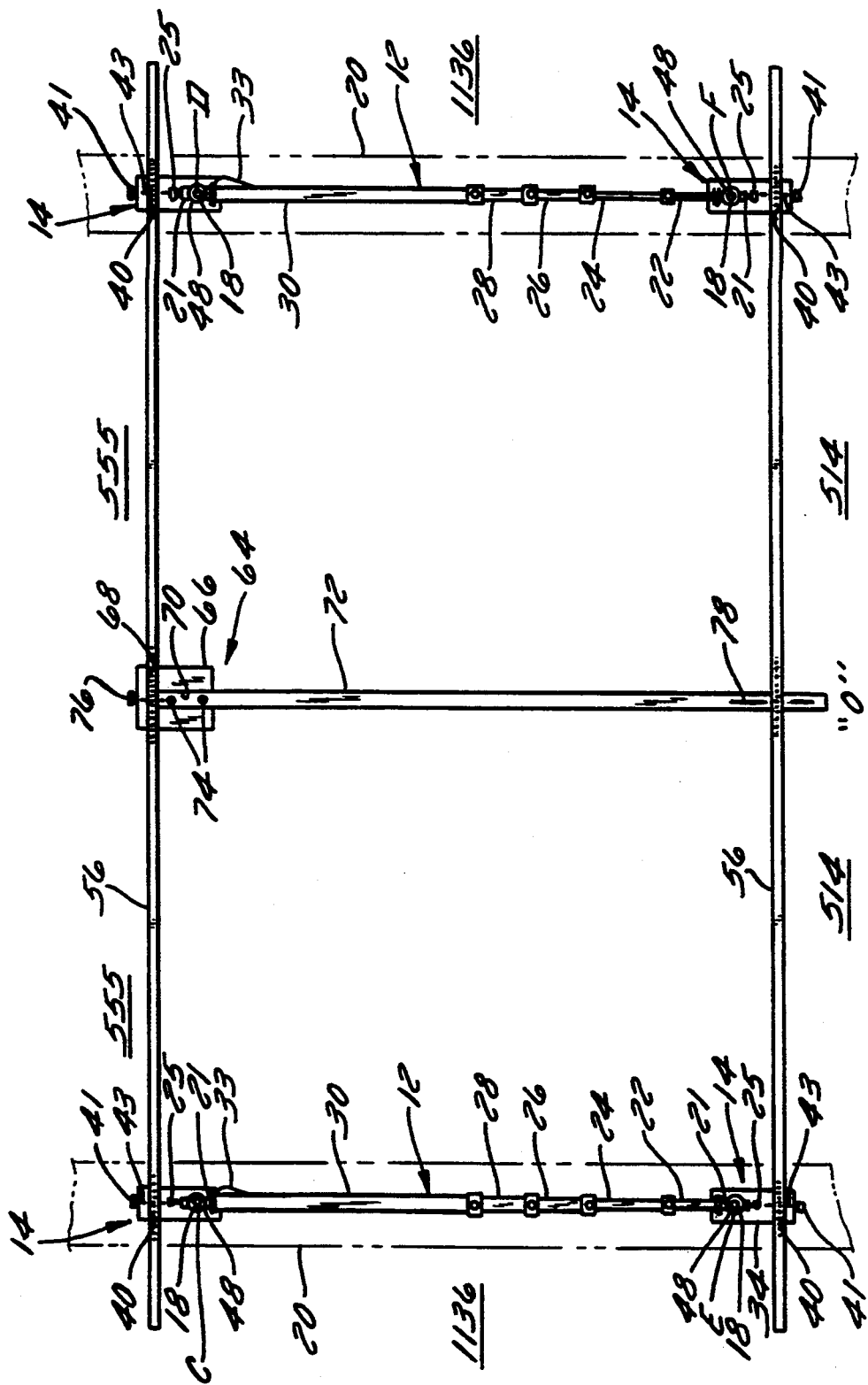
FIG. 7 is a top view of one arrangement of the measuring system.

Assuming the damage to the vehicle is in the back or rear of the frame as shown in FIG. 7, a set of the round pedestals 48 are seated on the pins 36 on a second pair of base plates 34. The width of the control points C and D is determined from the data sheet, which as shown in FIG. 9, is 1110 millimeters. A calibrated measuring bar 56 is placed in the machined grooves 40 in the base plates 34 with the 0 point of the measuring bar 56 located midway between the bases 34. One-half of the distance, 1110 millimeters, is 555 millimeters. The index line 43 on each base plate 34 should be set at 555 millimeters on each side of center on the measuring bar 56 and set by screws 41. The two pedestals are then aligned with the torque box control points C,D.

Two gauge bars 12 are then set to the distance between the control points C to E and D to F in the back of the damaged part of the frame. The distance between the control points C to E and D to F on the data sheet is 1136 millimeters. The gauge bars are both set at 1136 millimeters. The adapter 21 on the end of each of the gauge bars 12 is inserted into the cross bore 52 at the top of each of the first set of pedestals 48. A pointer 18 is dropped through the hole 54 in the top of the pedestal 48, the hole 23 in the adapter 21 and the bore 37 in pin 36. Each pointer 18 is then moved upward and aligned with the corresponding control point C and D on each side of the vehicle.

A second set of base assemblies 14 having cylindrical pedestals 48 are aligned with the adapter 21, on the other end of each of the frame gauges 12. A pointer 18 is inserted in the top hole 54 in the pedestal, the hole 23 in the adapter 21 and the bore 37 in pin 36 in the base plate 34. A second measuring bar 56 is then placed in the grooves 40 in the second set of base plates 34. The index lines 43 are set at 514 millimeters on each side of 0. The pointers 18 in each gauge bar 12 are then aligned with the corresponding control points E and F.

Figure 8:
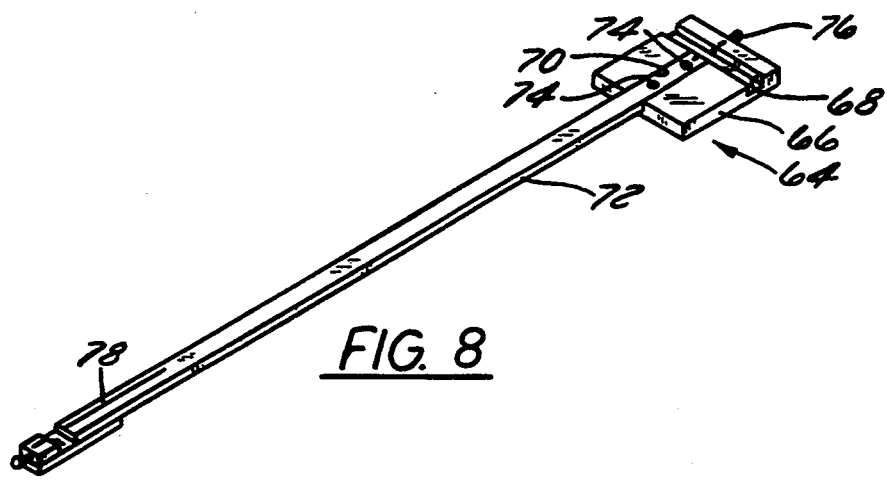
FIG. 8 is a perspective view of a squaring bar.

The relationship of the measuring bars 56 must be checked to determine the alignment of the control points E,F with the torque box control point C,D as required by the data sheet. This is accomplished by mounting a squaring bar, one embodiment is shown as 64 in FIGS. 7 and 8 on one of the measuring bars 56. The squaring bar 64 includes a mounting block 66 having a groove 68 across one side and a groove 70 perpendicular to groove 68. A measuring bar 72 is aligned in groove 70 and secured therein by pins 74. An index line 76 is provided in the edge of groove 68. The measuring bar 72 is provided with a center line 78 which is aligned with index line 76.

The groove 68 in the T-square type measuring bar 64 should be aligned with one of the measuring bars 56 with the index line 76 aligned with the center or "0" line on the bar 56. The other end of the bar 72 should be located under the other measuring bar 56 as shown in FIG. 7. The center line 78 on bar 72 should be aligned with the "0" line or center line 78. Although the T-square type bar 64 is described as aligned with "0" on the measuring bars 58, the squaring bar 64 can also be aligned with any other corresponding indicia to achieve the same result.

The vertical relation of the control points, C, D, E and F is determined by calculating the difference between the height of the control points C and D in the torque box and the height of the control points E and F in the rear of the vehicle. The difference between the height of the control points E and F and the height of the torque box control points C and D is then determined from the data sheet, FIG. 10. Referring to the data sheet, the control points C and D are indicated as 266 millimeters from the datum line. The height of the control points E and F is 452 millimeters. The difference between the height of control points C,D and E,F is therefore 186 millimeters. To determine the actual difference, the distance of the control points from the pedestals is determined by reading the graduated scale on the pointers 18 at the top surface of the pedestals. If the difference between the readings at the control points C and E or D and F is different than 186 millimeters, the points are out of line.

To check several control points at the same time, the two pointers 18 on a gauge bar 12 when the gauge bar 12 is supported by the two pedestals 48 are aligned with two of the control box control points as described above. A second gauge bar 12 is then set to the distance from one of the control points "C," as the case may be, to the control point to be measured as established on the data sheet. A plurality of gauge bars 12 are similarly set based on the number of control points to be measured from either C or D. The set gauge bars 12 are then slidably engaged on one of the pointers 18 by aligning the hole 23 in the adapter 21 on each gauge bar in a stacked manner. The other end of the gauge bar 12 opposite the end aligned with the pointer is aligned with the control point to be measured and a base assembly 14 having a pedestal 48 is positioned to engage the other end of the gauge bar 12. Each such gauge bar 12 is leveled as described above and locked in position by means of the thumb screw 25. In this method the relationship of the various control points can be established and compared to the data sheet to determine the amount of damage the vehicle encountered. The method embodied in this invention can be used in combination with collision repair equipment and not interfere with the operation of such equipment.

In the event that the base assembly 14 is mounted on an irregular surface as shown in FIG. 3, a support clip 80 is provided to support one end of the plate 34. The support clip 80, one embodiment of which is shown in FIG. 11, generally includes a U-shaped block 82 having legs 84 spaced apart a distance substantially equal to the thickness of base plate 34. The block 82 may be secured to the base plate 34 by means of a spring loaded ball 86. An adjustable pin 88 is provided in the block 82 for adjusting the height of the clip 80. The pin 88 is locked in position by means of a spring plate 90 having one end secured to the top of the block 82 and the other end angled upwardly from the block. The pin 88 is aligned with an elliptical opening 92 in the spring plate 90. The pin is locked in position by the upward movement of the pin in the opening 92 and released from the spring by the downward movement of the spring plate 90.

Thus, it should be apparent that there has been provided in accordance with the present invention a support system for a gauge bar measuring system that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A base assembly for supporting a gauge bar having pointers mounted thereon for determining the orientation of control points on a vehicle, said assembly comprising:
   a base plate having an upright supporting portion,
   a pedestal mounted on said upright portion for supporting the gauge bar, said pedestal includes a cross bore for engaging the gauge bar and a bore in said pedestal intersecting said cross bore whereby a pointer axially aligned in said bore intersects the gauge bar in said cross bore,
   means for selectively adjusting the position of said pedestal on said upright portion, and
   means mounted in said pedestal for matingly engaging one end of the gauge bar, whereby said pedestal can be adjusted to change the horizontal position of the gauge bar.

* * * * *